United States Patent
Keeler et al.

[15] 3,679,869
[45] July 25, 1972

[54] WARMER STAND FOR A SELECT NUMBER OF FLUID CONTAINERS

[72] Inventors: Richard A. Keeler, Tenafly, N.J.; Arthur Eckstein, Roslyn Heights, N.Y.

[73] Assignee: Chemex Corporation, New York, N.Y.

[22] Filed: Jan. 11, 1971

[21] Appl. No.: 105,382

[52] U.S. Cl.....................219/432, 219/433, 219/447
[51] Int. Cl..............................................F27d 11/02
[58] Field of Search..............219/430, 432, 433, 436, 439, 219/456, 460, 464, 445–447; 222/165, 572; 99/446

[56] References Cited

UNITED STATES PATENTS

| | | |
|---|---|---|
| 2,411,340 | 11/1946 | Schlumbohm.......................222/572 |
| 3,052,791 | 9/1962 | Jacobs et al......................219/449 X |
| 3,593,653 | 7/1971 | Buerki.............................219/445 X |
| 2,258,484 | 10/1941 | Cory................................219/433 X |
| 2,682,602 | 6/1954 | Huck....................................219/433 |
| 2,180,602 | 11/1939 | Morgan...........................219/460 X |
| 1,990,640 | 2/1935 | Doherty..........................219/464 X |
| 2,952,764 | 9/1960 | Minami................................219/432 |
| 1,006,104 | 10/1911 | Kuhn et al. ..........................219/433 |
| 2,430,715 | 11/1947 | Grayson..............................219/433 |
| 2,872,560 | 2/1959 | Bowles................................219/433 |
| 2,892,066 | 6/1959 | Springer.........................219/433 X |
| 3,313,919 | 4/1967 | Richardson et al..................219/433 |

Primary Examiner—Volodymyr Y. Mayewsky
Attorney—Robert E. Isner and Peter J. Franco

[57] ABSTRACT

A beverage warmer is provided which has a surface element for supporting a fluid container or vessel thereon and for transferring heat directed thereto by a heating element to the fluid container. The beverage warmer also has an annular upwardly projecting member contiguous with the surface element for reducing the amount of heat loss to the surrounding atmosphere.

4 Claims, 4 Drawing Figures

PATENTED JUL 25 1972

3,679,869

INVENTORS
RICHARD A. KEELER
ARTHUR ECKSTEIN

BY
ATTORNEY

WARMER STAND FOR A SELECT NUMBER OF FLUID CONTAINERS

This invention relates to beverage warmers such as hot plates which are utilized to heat up the contents of a fluid container such as coffee in a filter-type coffee maker.

Among the advantages of the present invention is the provision of a beverage warmer of increased efficiency which requires substantially less electrical energy to heat the fluid contents of a container to a preselected level and to maintain the fluid contents heated at that level.

Accordingly it is an object of the present invention to reduce heat losses from the beverage warmer to the atmosphere by radiation, conduction or convection.

Other objects and advantages of the present invention will become apparent from the following portions of this specification and from the accompanying drawings which illustrate, in accord with the mandate of the patent statutes, a presently preferred embodiment incorporating the principles of the invention.

Referring to the drawings.

Figures 1, 2, 3, 4:
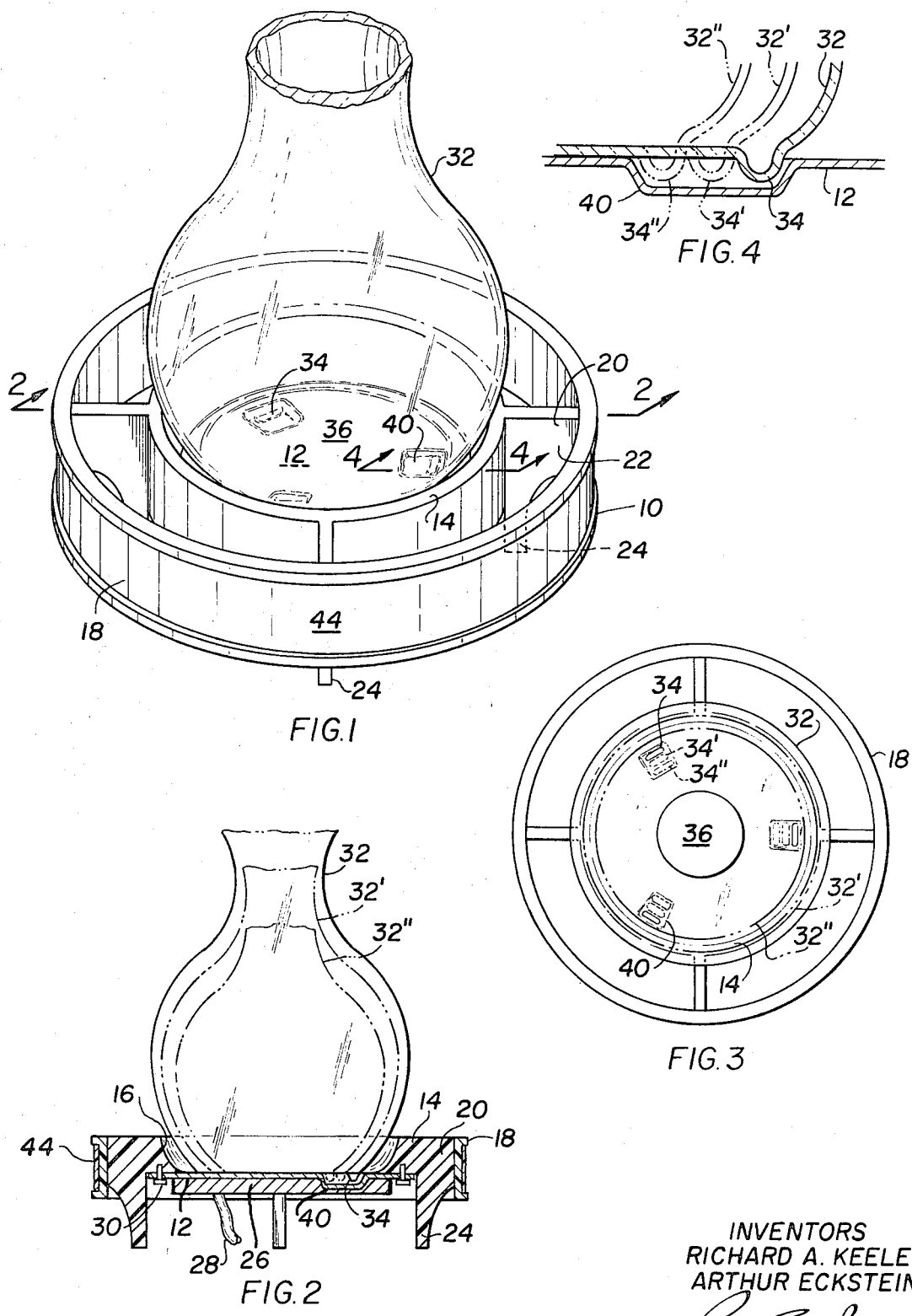
FIG. 1 is a perspective view of a beverage warmer made in accordance with the teachings of the present invention having a filter-type coffee maker thereon.
FIG. 2 is a view of the beverage warmer as constituted at the line 2—2 of FIG. 1.
FIG. 3 is a top view of the beverage warmer illustrated in FIG. 1 having the filter-type coffee maker thereon.
FIG. 4 is a view of the beverage warmer as constituted at the line 4—4 of FIG. 1.

Referring to the drawings and particularly to FIG. 1 a beverage warmer 10 is provided. The beverage warmer 10 has a central substantially horizontal container supporting surface 12 in the form of a heat transfer plate, an annular upwardly projecting member 14 contiguous with the container supporting surface and having an arcuate interior surface 16 and a spaced ring like member 18 joined to the annular upwardly projecting member by arm portions 20 of four strut members 22. The strut members have downwardly extending legs 24 which support the beverage warmer on a horizontal surface.

Referring to FIG. 2 the heat transfer plate 12 which may be made from an enameled steel is heated in a conventional manner by a heater diagrammatically illustrated at 26 which is connected by an electrical cord 28 to an electrical outlet (not shown). This heat transfer plate 12 is mounted to the annular upwardly projecting member 14 by screws 30 and becomes contiguous therewith.

The upwardly projecting annular member substantially reduces heat loss from the heat transfer plate when a container such as a filter-type coffee maker 32 is positioned thereon. A portion of the heat radiated from the heat transfer plate is reflected by this member which may be made from phenolic plastic, to strike the coffee maker thereby increasing the amount of heat radiated from the heat transfer plate which strikes the coffee maker. Additionally as the air adjacent to the heat transfer plate is heated it expands and naturally rises. The upwardly projecting annular member restricts such convective flow to the upward direction where this heated air stream will establish lamina flow up the surface of the container. The volume intermediate the arcuate surface 16 of the upwardly projecting annular member 14 and the sides of the coffee maker basically defines a divergent-convergent annular duct. The divergent portion of this duct accommodates this increased volume of the rising heated air but as the heated air further rises and passes through the convergent portion of this annular duct a pressure is created in the escaping heated air which greatly increases the flow rate thereof. This increased velocity increases the momentum of this rising heated air lamina and this increased momentum maintains the integrity of the lamina whereby the heat transfer from the lamina to the container will be increased.

The leg portions 24 of the strut members elevate the heat transfer surface 12 and the heating element 26 from the horizontal surface upon which the beverage warmer is placed and thereby minimizes heat loss from the beverage warmer via conduction to the horizontal surface.

The beverage warmer is especially suited for warming coffee or the like in filter-type coffee makers 32 such as are disclosed in U.S. Pat. No. 2,411,340. Such coffee makers have ridges 34 which project from the bottom 36 thereof. As the size of the coffee maker is reduced, 32', 32" (indicated in dotted lines in FIGS. 2 and 3) these ridges become smaller 34', 34" and are located closer to the center of the bottom thereof. It has been found that the effectiveness of the beverage warmer when warming coffee in the coffee maker is greatly increased by establishing planar contact between the bottom 36 of the coffee maker and the heat transfer plate 12 as compared to simply establishing linear contact between the bottom of the ridges of the coffee maker and the heat transfer plate. Accordingly recesses 40 (FIG. 4) are provided in the heat transfer plate which are sufficiently large enough to accommodate the ridges on any of the available sizes of coffee makers having such ridges whereby such planar contact will be measured.

The peripheral ring like member 18 provides a handle which is insulated by the air intermediate the central heated unit and the ring like member by which the beverage container can be displaced either while horizontal or vertical, or hot or cold and acts as a bumper to prevent a person from inadvertently touching the central heated unit. If desired a strip of vinyl material 44 can be secured to the outer vertical face of the ring like member.

Having thus described our invention, we claim:

1. A beverage warmer comprising
    support means for supporting a fluid container including
    planar conducting plate means for transferring heat directed thereto to a fluid container placed on said plate means,
    said plate means including a plurality of recess means for receiving the downwardly projecting ridges of any of a select number of fluid containers having ridges at locations progressively radially inwardly and with sizes decreasing radially inwardly as the size of the fluid container decreases,
    electrical heat source means secured to said support means proximate to the bottom surface of said plate means, and
    feet means secured to said support means for elevating said supporting means above the surface upon which said beverage warmer is placed.

2. A beverage warmer according to claim 1, wherein said recess means are in the form of keystones selectively sized to receive the downwardly projecting ridges of any of a selected number of fluid containers wherein the ridges thereof extend circumferentially in spaced relation about the base of the container and wherein the circumferential length of the ridges decreases as the size of the fluid container decreases.

3. A beverage warmer according to claim 1 wherein
    said recesses are selectively configured to substantially prevent the planar displacement of any one of the selected number of fluid containers placed on said planar conducting means with the ridges thereof inserted into said recesses.

4. A beverage warmer according to claim 1, further comprising an upwardly projecting outwardly confining annular member, comprised of thermally insulating material contiguous with said plate means for reducing heat loss from said plate means to the atmosphere when a fluid container is placed thereon.

* * * * *